United States Patent
Ihle et al.

(10) Patent No.: US 8,002,522 B2
(45) Date of Patent: Aug. 23, 2011

(54) CENTRIFUGAL PUMP

(75) Inventors: Olai Ihle, Eckental (DE); Thomas Peterreins, Nuremberg (DE); Helmut Schmidt, Fuerth (DE); Armin Suttner-Reimann, Schwabach (DE)

(73) Assignee: Bühler Motor GmbH, Nürnberg (DE)

( * ) Notice: Subject to any disclaimer, the term of this patent is extended or adjusted under 35 U.S.C. 154(b) by 1151 days.

(21) Appl. No.: 11/790,817

(22) Filed: Apr. 27, 2007

(65) Prior Publication Data

US 2008/0031748 A1 Feb. 7, 2008

(30) Foreign Application Priority Data

Apr. 28, 2006 (DE) .................. 10 2006 021 240

(51) Int. Cl.
*F04D 29/02* (2006.01)
*F04D 29/08* (2006.01)
*F04D 29/42* (2006.01)
*F04D 29/62* (2006.01)

(52) U.S. Cl. .................. 415/200; 415/206; 415/215.1; 156/272.8; 403/270

(58) Field of Classification Search .................. 415/200, 415/203, 204, 206, 213.1, 214.1, 215.1; 417/423.14; 310/89; 156/272.8; 403/270
See application file for complete search history.

(56) References Cited

U.S. PATENT DOCUMENTS

| 5,639,228 | A | * | 6/1997 | Van De Venne et al. . 417/423.14 |
| 6,663,362 | B1 | | 12/2003 | Lentz et al. |
| 6,802,929 | B2 | | 10/2004 | Ruotsalainen |

FOREIGN PATENT DOCUMENTS

| DE | 199 56 380 C1 | 4/2001 |
| DE | 602 08 599 T2 | 8/2006 |
| EP | 0 079 435 B1 | 3/1986 |

* cited by examiner

*Primary Examiner* — Christopher Verdier
(74) *Attorney, Agent, or Firm* — Jacobson Holman PLLC

(57) ABSTRACT

A centrifugal pump comprising a pump housing made of injection-molded plastics with a first housing part, which is designed as a single piece with a suction connection and a pressure connection, and comprises a sealing area, by means of which said first housing part is joined in a liquid-tight manner to a second housing part, that receives an electric motor, and a motor housing part. In this centrifugal pump, very good leak tightness is achieved with minimum number of parts, minimum weight and minimum assembly costs with universal applicability without impairing the visual overall impression of the centrifugal pump. This objective is achieved in that the second housing part is made of a material that is permeable to laser light of a wavelength or a wavelength range, and the first housing part is made of a material that absorbs the same laser light, and the first housing part and the second housing part are heat-sealed to one another.

18 Claims, 3 Drawing Sheets

CENTRIFUGAL PUMP

BACKGROUND OF THE INVENTION (1) Field of the Invention

The invention relates to a centrifugal pump comprising a pump housing made of injection-molded plastics with a first housing part, which is designed as a single piece with a suction connection and a pressure connection, and comprises a sealing area, by means of which said first housing part is joined in a liquid-tight manner to a second housing part, which receives an electric motor, and a motor housing part.

(2) Description of Related Art

A centrifugal pump of the generic type has been disclosed in U.S. Pat. No. 6,663,362 B1, in which pump a sealing ring has to be inserted for the purpose of sealing that pump room of the centrifugal pump, through which liquid flows. No seal is mentioned for the motor housing part. Furthermore, screws are provided with the help of which the housing parts are joined to one another. This known centrifugal pump comprises a large number of individual parts that have to be assembled. The leak tightness of the motor housing can be ensured only to a limited extent. The screwed joint between the housing parts reduces the possible applications of the pump since it is necessary to reserve a variant of the housing for every orientation of the pressure connection in relation to the fixing means of the centrifugal pump.

BRIEF SUMMARY OF THE INVENTION

It is therefore the object of the present invention to provide a centrifugal pump, in which very good leak tightness is achieved with a minimum number of parts, minimum weight and minimum assembly costs with universal applicability without impairing the overall visual appearance of the centrifugal pump.

This objective is achieved according to the invention in that the second housing part is made of a material that is permeable to laser light of a wavelength or a wavelength range, and the first housing part is made of a material that absorbs the same laser light, and the first housing part and the second housing part are heat-sealed to one another. The welded joint helps cut down on a sealing part and fixing means, such as screws, thereby making it possible to dispense with their assembly, weight and storage. The use of partly transparent material makes it possible to produce the welding joint at almost any secure location. Since the second housing part takes up the smallest portion of the visible housing surface in the generic pump type, this housing part is made of a material that is permeable to laser light, thereby only marginally impairing the visual overall impression of the centrifugal pump. The color of the material that is transparent to the laser beams also differs clearly from the usually black housing parts namely in the visible frequency range.

It is also suggested that the motor housing part be heat-sealed to the second housing part, the motor housing part being made of a material that can absorb the same laser light, to which the material of the second housing part is permeable. The selection of materials helps reduce the number of the plastic materials to be processed. By welding the motor housing part, it is possible to achieve an optimum sealing of current-carrying parts.

In order to achieve the desired sealing effect, the first housing part must comprise a first sealing area, the second housing part must comprise a second sealing area and a third sealing area, and the motor housing must comprise a fourth sealing area.

It is particularly advantageous for the visual appearance of the centrifugal pump if the second sealing area and the third sealing area are located close enough to one another that a maximum of 20% of the visible total area of the centrifugal pump and the electric motor is occupied by the second housing part.

According to a particularly preferred embodiment of the centrifugal pump, the first housing part and the second housing part have joint geometries, with the help of which it is possible to produce a force-fit or a form-fit between these housing parts. This force-fit or form-fit joint serves firstly as an easy handling in the assembly process. It is also possible in this way to carry out the pre-assembly and the final assembly at separate locations. Secondly, this joint makes it possible for the joint areas to abut against one another properly, thereby improving the quality of the welded joint.

For the same reasons, the second housing part and the motor housing part could comprise joint geometries, with the help of which it is possible to produce a force-fit or a form-fit between these housing parts. A particularly simple joint geometry is achieved if the joint geometries are tapered or conical surfaces that are complementary to one another. The wedge effect helps achieve a good force-fit joint.

If the first sealing area and the second sealing area are parts of the tapered or conical surfaces, then it is possible, as mentioned above, for the parts to be joined to abut against one another properly. This is also applicable if the third sealing area and the fourth sealing area are parts of the tapered or conical surfaces.

The second housing part is designed as a single piece with a containment shell, which separates a wet chamber of the centrifugal pump from a dry chamber.

An electronically commutated direct current motor preferably drives the centrifugal pump. In this case, the second housing part carries a stator of said motor. The first housing part comprises a first ring. A first flange of the first housing part can be attached to this ring. An outer surface of the first ring preferably represents a part of the joint geometries. Furthermore, the first sealing area is disposed on the first ring.

The second housing part comprises a second flange having a discoidal basic shape. A second ring is attached to the radially outer edge of the second flange. The second flange and the second ring expediently have a T-shaped cross-section. In this case, the ring inner surfaces separated from one another by the second flange represent parts of the joint geometries. The second and third sealing areas can be disposed on the second ring. The motor housing part comprises a third ring, an outer surface of the third ring representing a part of the joint geometries. The fourth sealing area is disposed on the third ring.

An important advantage of the centrifugal pump of the invention consists in its universal applicability. This is achieved by providing only the second housing part with fixing means for fixing the centrifugal pump. It is also possible to provide fixing means on the first and the second housing parts, which fixing means are designed such that a large number of angular positions are possible between the first and the second housing parts. However, in the latter case, it is no longer possible to carry out an infinitely variable selection of the angular position.

Grivory HTV 4H1 black is suggested as the preferred material for the first housing part and the motor housing part. Accordingly, Grivory HTV 4H1 natural can then be used for the second housing part. Both these suggested preferred materials are basically the same, but have different additives.

It is important that the form-fit or the force-fit joint between the first housing part and the second housing part allows for any angular position between both these housing parts. An annular snap joint is particularly suitable as a universal form-fit joint between the first and the second housing parts, in which annular snap joint the parts to be joined are only fixed axially.

A particularly preferred method for producing a centrifugal pump is characterized in that the first housing part is joined to the second housing part, and the second housing part is joined to the motor housing in one construction step by means of laser transmission welding. In this way, it is possible to reduce the processing time since both the seals need not be produced consecutively.

BRIEF DESCRIPTION OF THE SEVERAL VIEWS OF THE DRAWINGS

An exemplary embodiment is explained in detail with reference to the drawings, in which.

DETAILED DESCRIPTION OF THE INVENTION

Figure 1:
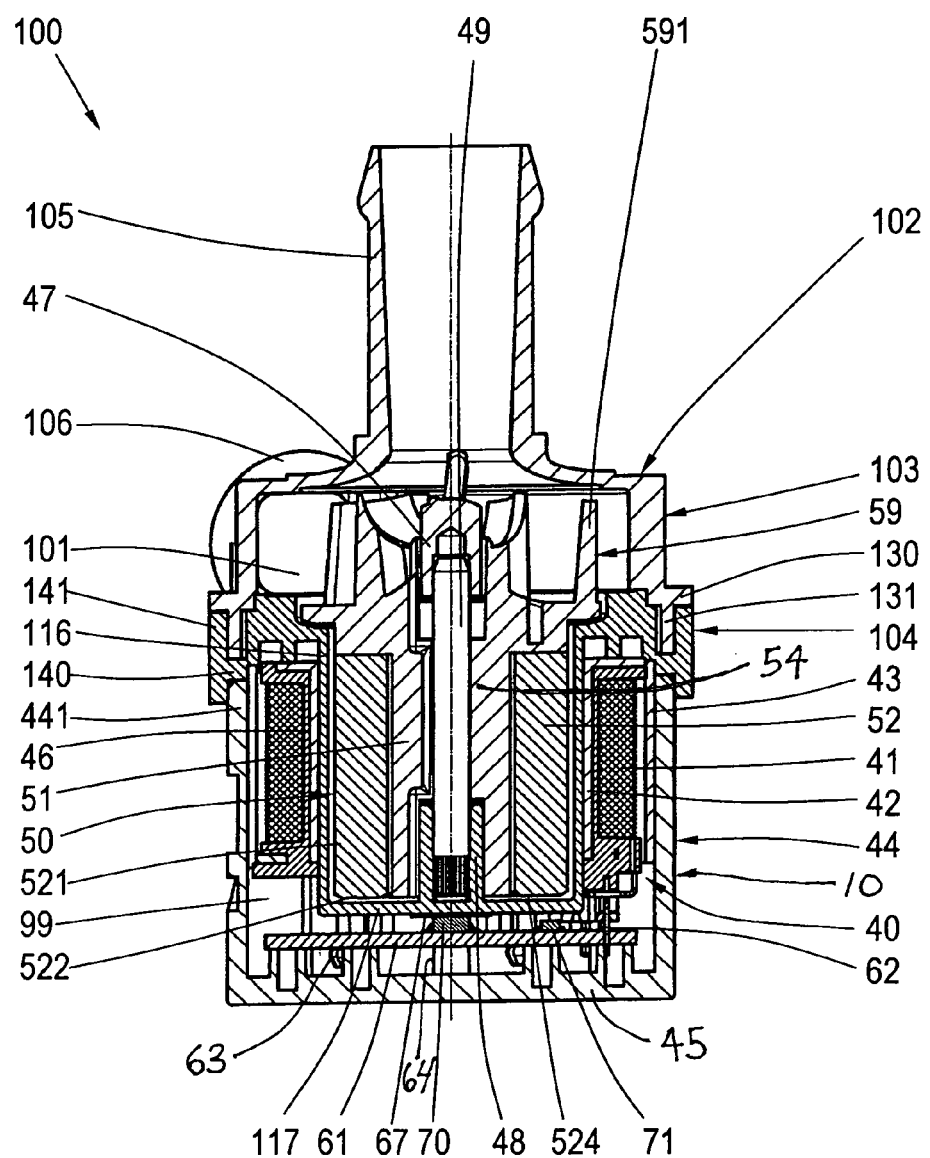
FIG. 1 shows a sectional view of a centrifugal pump of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a sectional view of the inventive centrifugal pump 100, with a pump housing 102 comprising a first housing part 103 and a second housing part 104 attached thereto. A motor housing part 44 delimits a dry chamber, which is filled out by a stator 40 of an electronically commutated direct current motor and its control electronic system. The motor housing part 44 is attached to the second housing part 104. The first and the second housing parts 103, 104 delimit a wet chamber 101 of the centrifugal pump. The second housing part 104 is designed as a single piece with a containment shell 116, which separates the wet chamber 101 from a dry chamber 99.

The wet chamber 101 comprises an axis 49, which is permanently installed between a containment shell-side axis receptacle 48 and a suction connection-side axis receptacle 47. A knurl on the end of the axis prevents a rotation of the axis 49 during the pump operation. A fixed bearing 54 is supported rotationally on the axis 49, which fixed bearing is pressed into a hollow shaft 51 of the rotor 50. The shaft 51 is designed as a single piece with a pump impeller 59, which comprises a plurality of approximately spirally shaped vanes 591 for conveying the liquid. The front surfaces of the fixed bearing 54 can be supported axially against the containment shell-side axis receptacle 48 and against the suction connection-side axis receptacle 47 by positioning thrust washers in between. A cylindrically hollow ferrite magnet 52 is glued on the hollow shaft 51, an elastic adhesive being used, which is inserted in four or five axially parallel grooves (not shown) formed in the hollow shaft.

The dry chamber 99 comprises the stator 40 of the electronically commutated direct current motor 10, which is designed in the form of a cylindrically hollow stator winding 41, its magnetic field being guided during operation to the periphery of the containment shell 116 by means of claw poles in an alternating manner and interacting with the cylindrically hollow permanent magnet 52 in the wet chamber 101. The magnetic circuit is closed by a return ring 43, which is connected to the claw poles 42. The claw poles 42 are provided by means of over-molding with an insulating body 46, which connects the claw poles 42 to one another mechanically, but not magnetically. The stator 40 comprises four pairs of poles in the present example. The insulating body 46 is shaped in such a way geometrically that the winding wires of the stator winding 41 can be connected to contact pins 62 comprising insulation displacement contacts, which can be fixed mechanically in the insulating body 46. The contact pins 62 are formed as combination contacts and their ends located opposite to the insulation displacement contact 63 are pressed into a printed circuit board 61, thereby contacting the latter. For this purpose, the contact pins 62 comprise one or two deformable press-in zones. The printed circuit board 61 comprises a Hall sensor 71, an integrated circuit 70 for wiring the stator winding, a PTC for the winding shield, and connector pins 64 for the voltage supply. The motor housing part 44 comprises a connector housing 65 in which the connector pins 64 are disposed. Electronic components with high heat losses are cooled by means of heat conducting foils 67 in the direction of the wet chamber 101. Conductor paths, which serve for the contacting of components to be cooled, are dimensioned so as to provide the broadest possible conductor paths 66 on the printed circuit board 61 for easier dissipation of heat. In order to achieve a particularly good utilization of the printed circuit board 61 and optimum heat dissipation, the different conductor paths 66 are designed with varying widths, depending on the amount of heat arising in the component connection to be contacted. A longitudinal groove is molded in the form of a cooling channel in the shaft 51 between a base 117 of the containment shell 116 and the pump impeller 59. This cooling channel enforces a continuous circulation of the conveying medium even in the interior of the containment shell 116. The printed circuit board is disposed between a front side 45 of the motor housing 44 and the base 117 of the containment shell 116 and is held in heat-conductive contact with the base 117 by means of the heat conducting foil 67.

The first housing part 103 comprises a first flange 130 and a first ring 131 attached thereto. The second housing part 104 comprises a second flange 140 and a second ring 141 attached thereto. The motor housing part comprises a third ring 441. The second flange 140 and the second ring 141 together form a T-shaped cross-section. Four sealing areas 133, 144, 145 and 444 are provided. The first sealing area is located on the radially outer side of the first ring 131 on the first housing part 103. The second sealing area 144 is located on the opposing radially inner side of the second ring 141 and of the second housing part 104. Likewise, the third sealing area 145 is located on the radially inner side of the second ring 141 and of the second housing part 104. The fourth sealing area 444 is located facing the third sealing area and on the radially outer side of the third ring 441 and of the motor housing part 44. The second housing part 104 is made of a material that is permeable to laser light of a wavelength or a wavelength range. The first housing part 103 and the motor housing part 44 are made of a material that absorbs the same laser light. A laser beam can thus be guided up to a joint without heating up the transparent material. Here, the beam hits the material, which absorbs the light and converts it into heat, thereby melting the plastic and causing it to form a deep joint with the adjoining material.

Since both the sealing areas to be heat-sealed are located close to one another, it is easily possible to produce both the joints in one welding unit and in one work step. The welding unit can comprise two individual lasers, each laser beam being used to produce a welding seam. Alternatively, the welding unit can comprise a single laser, the output beam of which is divided by a beam splitter into two bundles of rays, each of which produces one welding seam. In the present example, the laser beams are focused radially on the pump housing.

Figure 2:
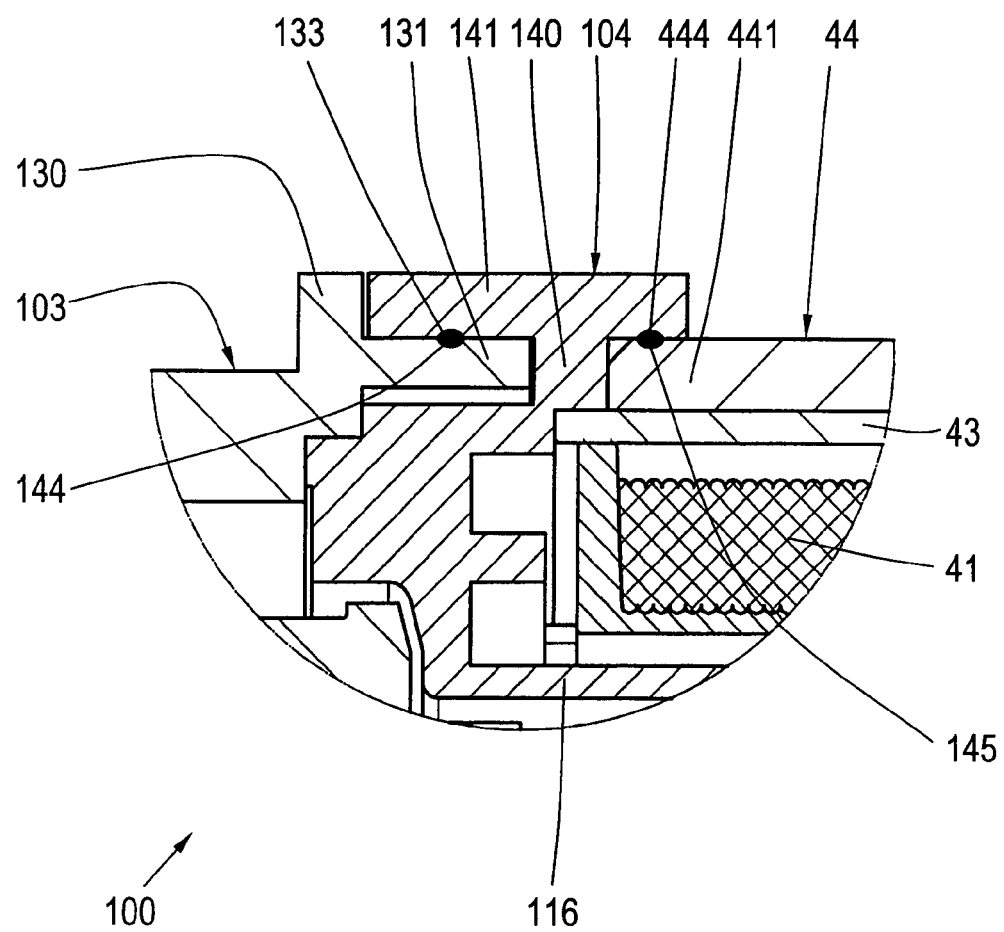
FIG. 2 shows an enlarged section of a joint area of a housing of the centrifugal pump.

FIG. 2 shows an enlarged section of the joint area of the first housing part 103 with the second housing part 104 and between the second housing part 104 and the motor housing part 44.

Figure 3:
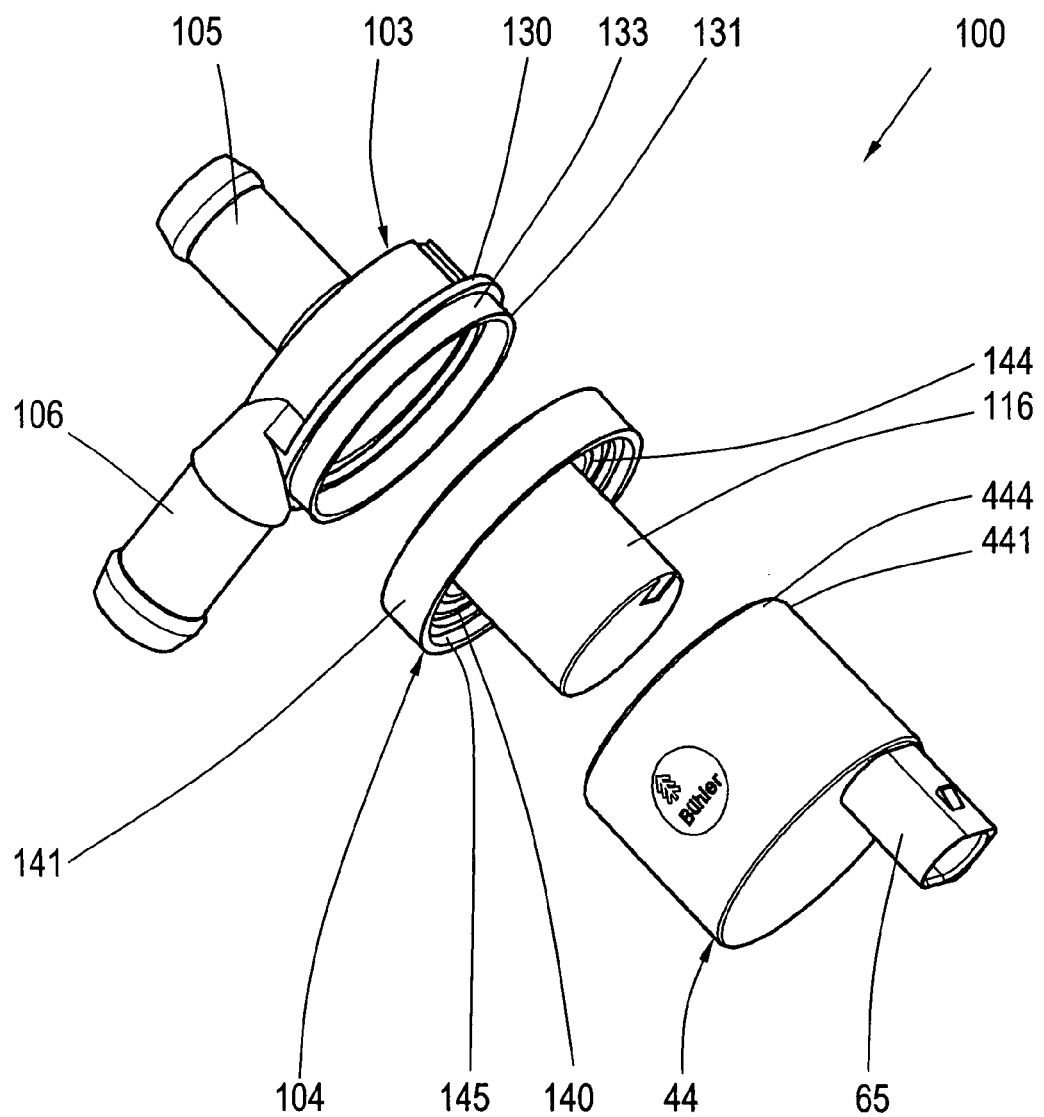
FIG. 3 shows an exploded view of a housing of the centrifugal pump.

FIG. 3 shows an exploded view of the housing of the centrifugal pump 100 with the first housing part 103, the second housing part 104 and a motor housing part 44. The first housing part 103 comprises a suction connection 105 and a pressure connection 106.

FIGS. 2 and 3 show the first flange 130 with the first ring 131 attached thereto and the first sealing area 133, the second housing part 104 comprising the containment shell 116, the second flange 140 and the second ring 141, the inner side of which comprises the second sealing area 144 and the third sealing area 145, and the motor housing part 44, which comprises the third ring 441 and the fourth sealing area 444. The first ring 131 and the second ring 141, the second ring 141 and the third ring 441 are coordinated to one another and are provided with a slightly tapered design. This results in a force-fit joint after the axial joining and even before the welding.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A centrifugal pump comprising: a pump housing made of injection-molded plastics with first and second housing parts, wherein the first housing part is a single piece with a suction connection, and a pressure connection, the first housing part including a first sealing area, by means of which the first housing part is joined in a liquid-tight joint to the second housing part; an electric motor housed in the second housing part; and a motor housing part attached to the second housing part, wherein the second housing part is made of a material that is permeable to laser light of at least one wavelength, and the first housing part is made of a material that absorbs the same laser light, and the first housing part and the second housing part are heat-sealed to one another.

2. The centrifugal pump according to claim 1, wherein the second housing part is heat-sealed to the motor housing part, the motor housing part being made of a material that can absorb the same laser light, to which the material of the second housing part is permeable.

3. The centrifugal pump according to claim 1, wherein the second housing part includes a second sealing area and a third sealing area, and the motor housing part includes a fourth sealing area.

4. The centrifugal pump according to claim 3, wherein the second sealing area and the third sealing area are located close to one another so that a maximum of 20% of the visible total area of the centrifugal pump and the electric motor is occupied by the second housing part.

5. The centrifugal pump according to claim 3, wherein the first sealing area and the second sealing area are parts of tapered or conical surfaces that are complementary to one another.

6. The centrifugal pump according to claim 5, wherein the third sealing area and the fourth sealing area are parts of the tapered or conical surfaces that are complementary to one another.

7. The centrifugal pump according to claim 1, wherein the second housing part is designed as a single piece with a containment shell, which separates a wet chamber of the centrifugal pump from a dry chamber.

8. The centrifugal pump according to claim 1, wherein the first housing part includes a first ring and a first flange wherein the first ring is attached to the first flange.

9. The centrifugal pump according to claim 8, wherein the first sealing area is disposed on the first ring.

10. The centrifugal pump according to claim 7, wherein the second housing part includes a second ring and a second flange having a discoidal shape.

11. The centrifugal pump according to claim 10, wherein the second flange has a radially extending outer edge and the second ring is attached to the outer edge of the second flange.

12. The centrifugal pump according to claim 11, wherein the second flange and the second ring have a T-shaped cross-section.

13. The centrifugal pump according to claim 12, wherein the first and second ring inner surfaces separated from one another by the second flange represent parts of the liquid-tight joint.

14. The centrifugal pump according to claim 11, wherein a second and a third sealing area are disposed on the second ring.

15. The centrifugal pump according to claim 3, wherein the motor housing part includes a third ring and the fourth sealing area is disposed on the third ring.

16. The centrifugal pump according to claim 1, wherein the material of the first housing part and of the motor housing part is Grivory HTV 4H1 black and the material of the second housing part is Grivory HTV 4H1 natural.

17. The centrifugal pump according to claim 1, wherein the liquid-tight joint between the first housing part and the second housing part allows for any angular position between both these housing parts.

18. Method for producing a centrifugal pump according to claim 1, wherein the first housing part is joined to the second housing part, and the second housing part is joined to the motor housing in one work step by means of laser transmission welding.

* * * * *